Nov. 19, 1968   C. GILKER   3,412,289
SEQUENCE CONTROL MEANS FOR REPEATING INTERRUPTERS
Filed Jan. 17, 1966
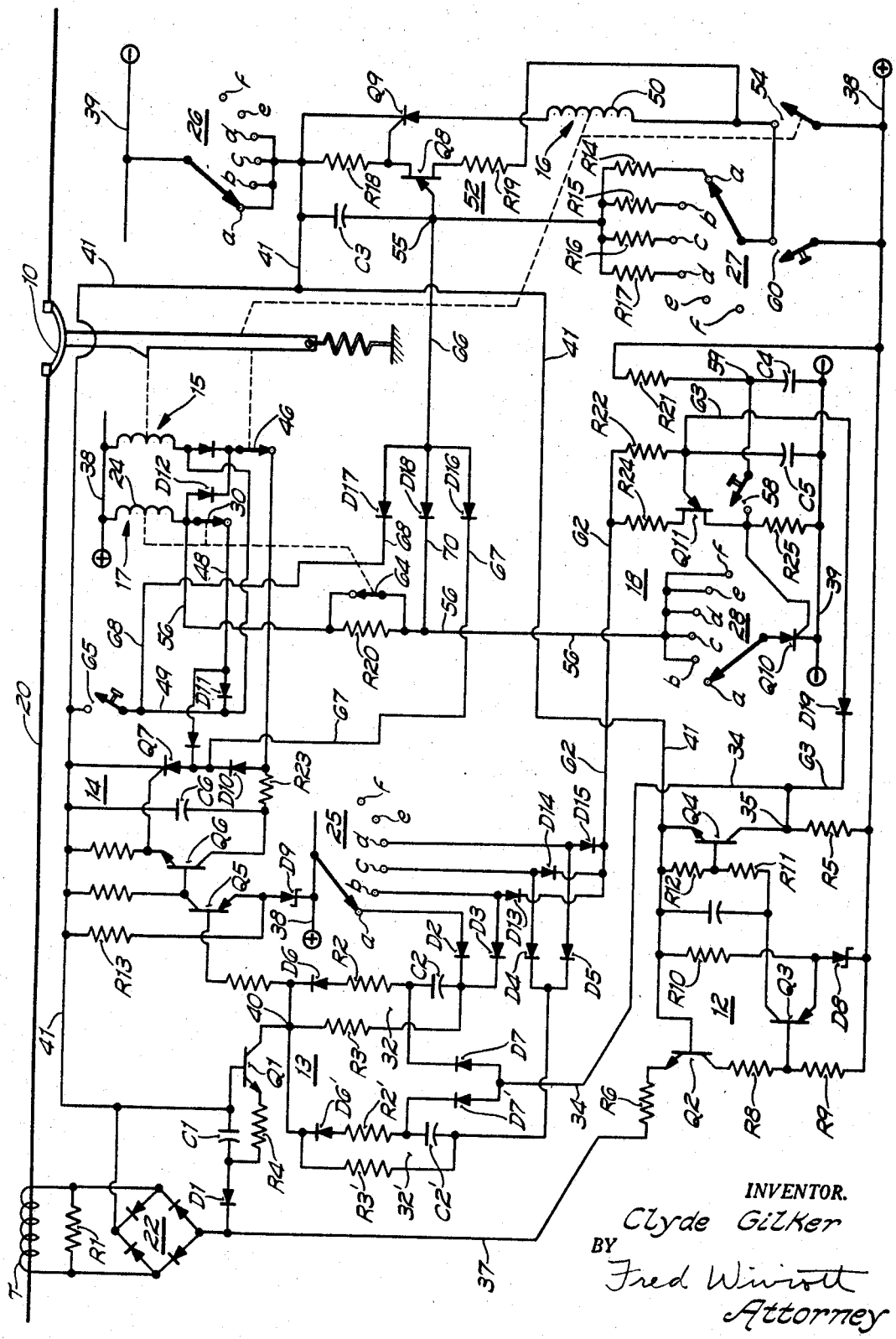
INVENTOR.
Clyde Gilker
BY Fred Winrott
Attorney United States Patent Office 3,412,289
Patented Nov. 19, 1968

3,412,289
SEQUENCE CONTROL MEANS FOR
REPEATING INTERRUPTERS
Clyde Gilker, South Milwaukee, Wis., assignor to Mc-
Graw-Edison Company, Milwaukee, Wis., a corpora-
tion of Delaware
Filed Jan. 17, 1966, Ser. No. 521,167
15 Claims. (Cl. 317—22)

ABSTRACT OF THE DISCLOSURE

A repeating circuit interrupter having a main switch which is controlled by a sequencing circuit to perform a sequence of opening and closing operations. An opening operation is initiated by a switch opening means after a predetermined time delay in response to an overload sensing circuit and a closing operation is performed by a switch closing means actuated by a closing control circuit after a predetermined closing time delay. The sequencing circuit controls the number of such opening and closing operations and is reset to its initial condition by a reset means after the completion of an operating sequence. A first disabling circuit prevents operation of the closing control circuit until the completion of a switch opening operation and a second disabling circuit prevents operation of the closing control circuit until the sequencing is reset to its initial condition following the completion of an operating sequence.

Background of the invention

This invention relates to repeating circuit interrupters and, more particularly, to means for insuring the proper sequence of operation of a repeating circuit interrupter in response to the occurrence of a predetermined circuit condition.

A repeating circuit interrupter or recloser may be characterized as a circuit protective device having abnormal condition sensing means connected to the system being protected and responsive to an abnormal circuit condition to initiate a switch opening operation. Reclosers also include switch reclosing means operable after each opening operation, opening and reclosing time delay means and sequencing means which is operable to initiate the various functions and to prevent reclosing after a predetermined number of opening operations.

Because the majority of faults in electrical distribution systems are temporary in nature and will clear in a relatively short period of time, it is common to arrange the switch opening means of the repeating circuit interrupter to execute a series of relatively rapid opening operations so that the period during which the system remains energized is shorter than the time required for other system protective devices, such as fuses, to operate. In addition, the circuit interrupter contacts should not be closed immediately in order to allow such fuses to cool. If the fault does not clear during this initial series of rapid operations, opening time delay means is actuated by the sequencing means so that there follows a second series of operations in which the recloser contacts remain closed for a period of sufficient length to allow the other system protected device to operate. If the fault has not cleared after a predetermined number of such time delayed operations, it is considered permanent and the sequencing means prevents the actuation of reclosing means so that the device is locked open. On the other hand, should the fault clear during any of the relatively rapid or time delayed operations, it is necessary for the operation counting means to be reset in its initial position so that upon the occurrence of a subsequent fault, the recloser will execute the full number of rapid and time delayed operations prior to being locked open. Such resetting means is usually time delayed so that premature resetting will not occur to interfere with normal operations.

Many prior art repeating circuit interrupters comprise a combination of mechanical and electrical components including electronic circuitry for performing various control functions. It is, therefore, extremely difficult under all conditions to insure the proper sequence of operation of the various electronic and mechanical elements. For example, it has been found in certain prior art circuit interrupters that a reclosing operation may be instituted before the completion of the opening operation or while the sequencing means is being reset or locked open.

It is an object of the invention to provide a repeating circuit interrupter with means for insuring the proper sequence of operation.

A further object of the invention is to provide a repeating circuit interrupter wherein initiation of a reclosing operation is prevented during a resetting operation.

These and other objects and advantages of the instant invention will become more apparent from the detailed description thereof taken with the accompanying drawing, which schematically illustrates the repeating circuit interrupter according to the instant invention.

Summary of the invention

In general terms, the invention comprises a repeating circuit interrupter including switch means in circuit with an electrical system, switch opening means, first control circuit means for performing a control function upon the occurrence of a predetermined condition, electroresponsive switch closing means, second control means operable to actuate the switch closing means, and disabling means for disabling the second control means until the completion of the control function by the first control circuit means.

Description of the preferred embodiment

Referring now to the drawing in greater detail, the illustrated repeating circuit interrupter or recloser is shown to have a main interrupting switch 10, an overload sensing circuit 12, a timing circuit 13, an output circuit 14, switch opening means 15, switch closing means 16, sequencing means 17, and resetting means 18.

The various portions of the repeating circuit interrupter will be discussed in greater detail hereinbelow, it being sufficient at this point to state that when a predetermined overcurrent is sensed by the overcurrent sensing circuit 12, a signal is provided to the timing circuit 13 which then initiates a timing operation, and, after a predetermined interval provides a signal to the output circuit 14 which then actuates the switch opening means or trip coil 15 so that interrupting switch 10 will be moved to its open position. Upon this event, the reclosing means 16 is made operable to return the interrupting switch 10 to its closed position. The sequencing means 17, performs the operation counting and lockout functions and insures the desired sequence of opening and reclosing operations.

For a more complete description of the circuit breaker operating mechanism usable with the illustrated control mechanism, reference is made to copending application Ser. No. 325,215, filed Nov. 21, 1963, and assigned to the assignee of the instant invention.

Before continuing with the discussion of the various circuit portions mentioned above, the operation of the sequencing means 17 will be discussed briefly. The sequencing means is schematically illustrated to include a stepping relay coil 24 and step switches 25, 26, 27 and 28, although any well-known type of mechanical or static stepping device may be employed. The sequencing means 17 is sequentially operable to a plurality of stages, symbolized by a movable wiper and taps or stages $a$–$f$ for each of the step switches. Each time the coil 24 is energized, it is operable to simultaneously advance each wiper one tap from $a$–$f$ and back to $a$. While it may appear from the schematically illustrated step switches that the circuit through each will be momentarily opened when their respective wipers are between positions, in actual practice the switches are of the type wherein the wiper bridges over to the next contact before moving off to the previous one so that circuit integrity is maintained. For this reason, contacts 30 are provided in the relay 18 energizing circuit and are arranged to open and reclose each time the coil 18 advances the step switches so that coil 18 will be de-energized and drop out in preparation for a succeeding stepping operation.

Referring again to the overcurrent sensing circuit 12, the timing circuit 13 and the output circuit 14, these are shown to be coupled to the system 20, by the current transformer T, a resistor R1 and the full wave rectifier 22 whose output terminals are connected across a capacitor C1 and a diode D1. As a result, a voltage will appear across capacitor C1 which is proportional to the current flowing in the system 20.

The timing circuit 13 includes a first timing circuit portion 32 connected through isolating diodes D2 and D3 to taps $a$ and $b$, respectively, of stepping switch 25 and a second timing circuit portion 32' connected through isolating diodes D4 and D5 to taps $c$ and $d$ of said switch. The timing circuit portions 32 and 32' are identical except for the size of their components which determine their time delay characteristics and, accordingly, only timing circuit portion 32 will be discussed in detail for the sake of brevity.

Timing circuit portion 32 is shown to include a timing capacitor C2 connected in series with a timing resistor R2 and a diode D6 and the series combination connected in parallel with a second timing resistor R3. As has been fully discussed in copending application Ser. No. 800,567 filed Mar. 19, 1959, and assigned to the assignee of the instant invention, the impedance values of capacitor C2 and resistors R2 and R3 determine the charging time for any given fault current in the system 20. Under normal operating conditions, the tap switch 25 will be initially connected to tap $a$ so that timing circuit 32 will be operable during the first opening operation.

A transistor Q1 couples the time delay circuit 13 to the capacitor C1, wherein its collector is connected to the timing circuits 32 and 32' while its base is connected to one terminal of capacitor C1 and its emitter is connected to the other terminal thereof through resistor R4. As a result, the current flowing to the collector of transistor Q1, which is a function of the voltage across capacitor C1, will split between the parallel paths defined by the resistor R3 and the series combination of timing resistor R2 and capacitor C2.

When there is no fault in the system 20, capacitor C2 is prevented from charging because it is shunted by a leakage resistor R5 located in the overload current sensing portion 12 and to which it is connected by a diode D7 and conductor 34. As a result of this leakage current, the terminal 35 of resistor R5 will have some positive potential.

Turning now to the overcurrent sensing circuit 12, it is shown to include a transistor Q2 whose emitter is connected to one output terminal of full wave rectifier 22 through resistor R6 and conductor 37 such that its emitter current flowing through resistors R8 and R9 to the positive bus 38 will also be proportional to the peak current in the system 20. The base of a second transistor Q3 is connected to the junction between resistors R8 and R9 while its emitter is held at a constant potential by a Zener diode D8 and a resistor R10 connected in series between the positive bus 38 and a conductor 41 which is normally connected to the negative bus 39 through step switch 26. Thus, by a proper selection of components, transistor Q3 can be considered as a level detector which is rendered conductive when the current in the system 20 equals or exceeds the desired minimum actuating current for the device.

Upon the occurrence of an overcurrent in the system 20, the emitter of Q3 will become sufficiently positive relative to its base so that electric current will flow to the negative bus 39 through resistors R11 and R12. This provides a base signal to transistor Q4 which then becomes conductive to connect terminal 35 of resistor R5 to the negative bus 39. This, in turn, causes terminal 35 to assume a negative potential so that leakage current can no longer flow from capacitor C2. As a result, timing capacitor C2 is prevented from discharging through leakage resistor R5 and, therefore, begins charging. In this manner, the timing operation is initiated. Diode D7 performs the function of preventing reverse current flow from terminal 35 to the capacitor C2.

The output circuit portion 14 includes a second level detecting transistor Q5 whose base is connected to the junction between the collector of transistor Q1 and timing circuit 32 and whose emitter is held at a constant potential by a Zener diode D9 and a resistor R13 which are connected in series between the positive bus 38 and conductor 41. The collector of transistor Q5 is connected to the base of a switching transistor Q6 whose emitter, in turn, is connected to the gate of a silicon controlled rectifier Q7. The anode and cathode of Q7 are connected in series circuit relation with a diode D10 and the trip coil 15 and the series combination is connected between positive bus 38 and conductor 41.

After timing capacitor C2 has charged for a predetermined time, which is the time delay for the first operation of the device, the potential at junction 40 will reach the point where transistor Q5 is rendered conductive which, in turn, makes the base of transistor Q6 more positive than its emitter so that Q6 will also become conductive to provide a gate signal to control rectifier Q7. Upon this event, Q7 will become conductive to complete an energizing circuit to trip coil 15 which then opens the main switch 10 in a manner well known in the art. When the main switch 10 reaches its fully opened position, contacts 46, connected in series therewith, will be opened to de-energize trip coil 15 and render silicon controlled rectifier Q7 nonconductive.

The stepping relay 24, which is connected in parallel with trip coil 15 by conductors 48, 49 and isolating diode D11, will also be energized when silicon controlled rectifier Q7 is rendered conductive so that each of the step switches 25, 26, 27 and 28 will be moved to their $b$ taps. As a result, the time delay circuit portion 32 will also be effective during the second switch opening operation. Should the fault persist, requiring a third and a fourth opening operation, the switch 25 will be moved to taps $c$ and $d$ so that time delay circuit portion 32' will be effective whereby the third and fourth opening operations may have a longer time delay than the initial operations.

The reclosing circuit 16 includes a closing coil 50 mechanically coupled to the main switch 10 and a closing time delay circuit 52 which includes four resistors R14, R15, R16 and R17 each of which has one terminal connected to taps $a$, $b$, $c$ and $d$ respectively of step switch 27. In addition, the closing time delay circuit 52 also includes a capacitor C3 connected between conductor 41 and the other terminals of resistors R14–R17. The emitter electrode of a unijunction transistor Q8 is connected to the junction 55 between capacitor C3 and resistors R14–R17 while its base-one electrode is connected through resistor R18 to conductor 41 and its base-two electrode is connected through resistor R19 to contacts 54, the latter of which are coupled to the main switch 10 and which are opened when said main switch is closed and which are closed when the main switch is opened. The closing time delay circuit 52 also includes a silicon controlled rectifier Q9 whose gate electrode is connected to the base-one electrode of unijunction transistor Q8 and whose anode and cathode electrodes are connected in series with the closing coil 50 and the series combination is connected to conductor 41 and the positive bus 38 through contacts 54.

It will be recalled that upon the initial operation of the repeating circuit interrupter, each of the step switches 25–28 will be on tap *a*. When the trip coil 15 is energized in the manner discussed hereinabove, the stepping relay coil 24 will also be energized to advance each of the step switches 25–28 to their *b* taps. When the switch 10 reaches its fully opened position, contacts 54 will close to complete an energizing circuit to capacitor C3 through resistor R15 and step switches 26 and 27. After a time delay, determined by the relative sizes of resistor R15 and capacitor C3, the junction 55 therebetween will reach the breakover potential of unijunction transistor Q8. This will cause current flow through the emitter base-one circuit of Q8 to provide a gate signal to silicon controlled rectifier Q9, which then becomes conductive to energize closing coil 50 whereby the main switch 10 is closed. Upon this event, auxiliary contacts 54 open to de-energize closing coil 50 and to interrupt the anode current to silicon controlled rectifier Q9 which then becomes nonconductive.

Should the fault in system 20 reappear when the main switch 10 is reclosed, this will again be sensed by the overcurrent sensing circuit 12 which initiates a second timing operation by timing circuit portion 32 so that trip coil 15 will be energized to open the main switches 10 and the stepping relay coil 24 will advance each of the step switches 25–28 to their *c* taps. When the main switch 10 opens for a second time, capacitor C3 will be charged through resistor R16 so that controlled rectifier Q9 will become conductive after a second time delay to energize the closing coil 50 and initiate a second closing operation. Similarly, should the fault persist after the second reclosing operation, trip coil 15 will be energized after a relatively long time delay dictated by time delay circuit 32' to again open the main switch 10. In a like manner, after the third opening operation, the stepping relay coil 24 will move each of the step switches 25–28 to their *d* taps whereupon closing coil 50 will be energized as a result of the charging of capacitor C3 through resistor R17. If the fault continues after the third closing operation, trip coil 15 will again be energized to open the main switch 10 and stepping relay coil 24 will advance each of the step switches 25–28 to their *e* taps.

It can be seen that because the taps *e* of switches 26 and 27 are open-circuited, closing coil 50 will remain de-energized even though contacts 54 are closed when the main switch 10 is open. As a result, the main switch will not reclose. In this manner, the recloser is locked in open position after a predetermined number of opening and closing operations.

Resetting of the recloser, after it has been locked open in the manner described above, is accomplished by means of the reset circuit 18 which includes silicon controlled rectifier Q10 whose cathode is connected to the negative bus 39 and whose anode is connected to the wiper of step switch 28. Taps *b–f* of step switch 28 are connected to the stepping relay 24 by resistor R20 and conductor 56. The gate electrode of silicon controlled rectifier Q10 is connected through manual switch 58 to the junction 59 between a capacitor C4 connected to the negative bus 39 and a resistor R21 connected to the positive bus 38.

It will be recalled that after lockout, each of the step switches 25, 26, 27 and 28 will be connected to tap *e*. It will also be appreciated that capacitor C4 will normally be charged so that when manual switch 58 is closed the silicon controlled rectifier Q10 will become conductive to energize the stepping coil 24 which then moves each of the step switches 25–28 to their taps *f*. Controlled rectifier Q10 will remain conductive through tap *f* of switch 28 so that each of the step switches 25–28 will be moved to their *a* taps, whereupon they are in position for a switch closing operation. Diode D12 between stepping relay coil 24 and trip coil 15 prevents energization of the latter during the resetting operation just described.

After the step switches 25–28 have been cycled to their *a* taps by manual switch 58, a charging circuit is completed to capacitor C3 through tap *a* on step switch 27, resistor R14 and switch 54 which is closed when the main switch 10 is open. This initiates a switch 10 closing operation in the manner previously discussed.

As stated hereinabove, the recloser will cycle itself to lockout only if the fault current exists for a predetermined number of opening and closing operations. The reset circuit 18 is also operative to reset the device should the fault current clear after a lesser number of opening and reclosing operations. For this purpose a unijunction transistor Q11 is provided with its emitter electrode connected to the junction 61 between capacitor C5 and a resistor R22. The other side of capacitor C5 is connected to the negative bus 39 and the other side of resistor 22 is connected to conductor 62 which is connected to taps *b*, *c* and *e* of step switch 25 through isolating diodes D13, D14 and D15, respectively. In addition, the base-one electrode of unijunction transistor Q11 is connected to negative bus 39 through resistor R25 and to conductor 62 through resistor R24.

Before the commencement of any switch opening or closing operation, each of the step switches 25–28 will be on their *a* taps so that the silicon controlled rectifier Q10 and capacitor C5 will be open-circuited through tap *a* of step switch 25 whereby the reset circuit will be inactive.

It will be recalled that after the first opening operation, each of the step switches 25–28 will be moved from their *a* taps to their *b* taps whereupon conductor 62 is connected to the positive bus 38 by step switch 25. It will also be recalled that if the fault current reappears in the system 20 after the first switch closing operation, transistor Q4 of the overcurrent sensing circuit 12 will be rendered conductive to connect junction point 35 to conductor 41 which, in turn, is connected to the negative bus through step switch 26. Conductor 63 and isolating diode D19 which are connected to junction point 35 also prevent the accumulation of charge on capacitor C5 by shorting the latter to the negative bus 39. As a result, reset circuit 28 remains inactive whenever the main switch 10 closes in on a fault after a switch opening operation.

Assume, on the other hand, that subsequent to the first switch opening operation the main switch 10 closes and the fault has been cleared from the system 20. As a result, transistor Q4 remains nonconductive and junction point 35 is isolated from conductor 41. Charge may then accumulate on capacitor C5 through one of the taps *b*, *c* or *d* of step switch 25 and resistor R22. After a time delay, determined by the relative sizes of resistor R22 and capacitor C5, the breakover potential of unijunction transistor Q11 will be reached and it will conduct emitter-base-one current through resistor R23. This provides a gate signal to the silicon controlled rectifier Q10 which becomes conductive to complete an energizing circuit through the stepping relay coil 24 to advance each of the step switches to their next taps. Contacts 64, which are connected in shunt with the resistor R20 and which open and close each time relay coil 24 is energized, will cause said relay to drop out after each stepping operation. Resistor 20, however, allows the controlled rectifier Q10 to remain energized during each stepping operation so that relay coil 24 will be immediately re-energized and will advance each of the step switches 25–28 to their next taps when contacts 64 reclose. Resistor 20, however, is sufficiently large to allow relay 24 to drop out between stepping operations. The action just described will continue until each of the step switches 28 reach their *a* taps whereupon controlled rectifier Q10 will be open-circuited through tap *a* of switch 28 and will become nonconductive.

If it is desired to initiate a manual switch opening operation, manual contacts 65, which are connected in parallel with control rectifier Q7 of the output circuit 14, are closed to immediately energize the trip coil 42 whereby the main switch 10 is opened. The closing of switch 65 also energizes the stepping relay coil 24 which causes each of the step switches 25–28 to advance to their *b* taps. In addition, contacts 30, in series with stepping relay coil 24, open and close so that coil 24 drops out and is then re-energized to advance step switches 25–28 to their next taps and so on until coil 24 becomes open-circuited by tap *e* of step switch 26.

Step switch 26 is provided to de-energize each of the portions of the circuit except the reset circuit 18 whenever the recloser is in its lockout position wherein switch 26 is on tap *e*.

The foregoing discussion of the repeating circuit interrupter is essential to the understanding of the invention discussed hereinbelow.

It will be recalled that a switch closing operation is initiated when either the manual switch 60 or the switch 54 is closed, the latter switch being mechanically coupled to the main switch 10 and closes when the latter reaches its fully open position. In order for proper coordination of the repeating circuit interrupter with other protective devices in the system 20, it is essential that the requisite closing time delay be achieved. This purpose will be frustrated, however, should charge be accumulated on capacitor C3 or should contacts 54 be closed prematurely. In order to prevent the latter contingencies, junction point 55 between closing time delay capacitor C3 and resistors R14–R17 is connected by a diode D16 and conductors 66 and 67 to the anode of silicon controlled rectifier Q7 of the output circuit 14. As a result, whenever Q7 is made conductive to energize trip coil, capacitor C3 will be short-circuited so that charge cannot accumulate on capacitor C3 should the contacts 54 close prematurely. In this manner also, capacitor C3 will be fully discharged prior to the initiation of any switch closing operation. As a result, the full closing time delay will be achieved after each switch opening operation.

A second diode D17 which connects junction point 55 to the manual trip switch 65 through conductor 68, similarly prevents a switch closing operation when the manual trip switch 65 is closed. Also, a third diode D18, which is connected by conductor 70 to conductor 56, shorts capacitor C3 whenever silicon controlled rectifier Q10 is conductive during a resetting operation to prevent a reclosing operation while the stepping relay coil 24 is being reset.

While only a single embodiment of the instant invention has been shown and described, it is not intended to be limited thereby but only by the scope of the appended claims.

I claim:

1. A repeating circuit interrupter including switch means in circuit with an electrical system, switch opening means coupled to said switch means, first control circuit means coupled to said system and to said switch opening means for actuating said switch opening means upon the occurrence of a predetermined condition in said system, electroresponsive switch closing means coupled to said switch means, second control circuit means coupled to said switch closing means for initiating the operation thereof, and disabling means coupled to said first and second control circuit means for disabling said second control circuit means and to prevent the initiation of a switch closing operation until the completion of a switch opening operation.

2. A repeating circuit interrupter set forth in claim 1, wherein said first control circuit means is operable to produce a first signal to initiate a switch opening operation, means for interrupting said signal when said switch opening operation is completed, said disabling means being responsive to said signal for preventing the operation of said second circuit means.

3. The repeating circuit interrupter set forth in claim 1 wherein said second control circuit means includes integrating time delay means operable to begin an integrating operation after a switch opening operation, said disabling means being operable to prevent said integrating operation.

4. The repeating circuit interrupter set forth in claim 3 wherein said disabling means is also operable to return said time delay means to its unintegrated state after a closing operation.

5. The repeating circuit interrupter set forth in claim 4 wherein said switch opening means comprises electroresponsive means and said first control circuit means is operative to complete an energizing circuit thereto, said disabling means comprising discharge circuit means coupled to said first control circuit means for completing a discharge path to said integrating time delay means when said energizing circuit is completed by said first control circuit means.

6. The repeating circuit interrupter set forth in claim 5 wherein said integrating time delay means comprises energy storage means and said second control circuit means includes level detecting means operable to initiate a switch closing operation when the energy stored on said storage means reaches a predetermined value.

7. The repeating circuit interrupter set forth in claim 6 wherein said first control circuit means includes switching circuit means coupled to said switch opening means and overcurrent responsive means coupled to said system for actuating said switching circuit means upon the occurrence of a predetermined current in said system, said first control circuit means also including manually operable means coupled to said switch opening means, said discharge ciricut means being coupled to each of said switching circuit means and said manually operable switching means.

8. The repeating circuit interrupter set forth in claim 7 wherein said integrating time delay means comprises RC circuit means having a resistance and a capacitance and wherein said second circuit means includes means coupled to said switch means for completing an energizing circuit to said RC circuit means when said switch means is open, said discharge circuit means being connected to said capacitance.

9. The repeating circuit interrupter set forth in claim 1 wherein said second control circuit means includes signal means for producing a predetermined electrical signal and detecting means coupled to said signal producing means and operable to initiate a switch closing operation upon the occurrence of said signal.

10. The repeating circuit interrupter set forth in claim 9 wherein said disabling means is coupled to said signal means for providing a shunt path to prevent the operation of said detecting means.

11. The repeating circuit interrupter set forth in claim 10 wherein said first control circuit means includes switching circuit means coupled to said switch opening means and overcurrent responsive means coupled to said system for actuating said switching circuit means upon the occurrence of a predetermined current in said system, said first control circuit means also including manually operable switching means coupled to said switch opening means, said disabling means being coupled to each of said switching circuit means and said manually operable switching means, said switching circuit means and said manually operable switching means being operable to complete said shunt path.

12. A repeating circuit interrupter including switch means in circuit with an electrical system, switch opening means coupled to said switch means, overload responsive means coupled to said system for initiating the operation of said switch opening means upon the occurrence of an overload in said system, electroresponsive switch closing means coupled to said switch means, second control means coupled to said switch closing means for initiating a switch closing operation, sequencing means coupled to said overload responsive means and to said switch closing means for governing the sequence of operation thereof, reset means for resetting said sequencing means in an initial state following the operation thereof through a sequence of operations, and disabling means coupled to said reset means and to said second control means for preventing the operation of said second control circuit means till the completion of a resetting operation.

13. The repeating circuit interrupter set forth in claim 12 wherein said second control circuit means includes integrating time delay means operable to begin an integrating operation after a switch opening operation, said disabling means being operable to prevent said integrating operation.

14. The repeating circuit interrupter set forth in claim 13 wherein said sequencing means comprises electroresponsive means and said first control circuit means is operative to complete an energizing circuit thereto, said disabling means comprising discharge circuit means coupled to said first control circuit means for completing a discharge path to said integrating time delay means when said energizing circuit is completed by said first control circuit means.

15. The repeating circuit interrupter set forth in claim 14 wherein said first control circuit means includes switching circuit means coupled to said resetting means and means coupled to said overload responsive means for actuating said switching circuit means upon the return of normal current in said system.

References Cited

UNITED STATES PATENTS

| | | | |
|---|---|---|---|
| 3,198,989 | 8/1965 | Mahoney | 317—22 X |
| 3,246,206 | 4/1966 | Chowdhuri | 317—22 X |
| 3,273,018 | 9/1966 | Goldberg | 317—33 X |
| 3,319,126 | 5/1967 | Green et al. | 317—33 |
| 3,328,638 | 6/1967 | Reis | 317—22 |

LEE T. HIX, *Primary Examiner.*

R. V. LUPO, *Assistant Examiner.*